United States Patent [19]

Beckenbach et al.

[11] 4,452,584

[45] Jun. 5, 1984

[54] RING SHAFT KILN FOR CALCINING MATERIALS AND A METHOD OF OPERATION

[76] Inventors: Ulrich Beckenbach, Fontanestrasse 13; Helmuth Beckenbach, An den Linden 47, both of D4005 Meerbusch 1, Fed. Rep. of Germany

[21] Appl. No.: 357,701

[22] Filed: Mar. 12, 1982

[30] Foreign Application Priority Data

Dec. 25, 1981 [EP] European Pat. Off. ........ 81110786.1

[51] Int. Cl.³ .............................................. F27D 1/08
[52] U.S. Cl. ...................................... 432/14; 432/99; 432/101; 110/264
[58] Field of Search .................... 432/14, 99, 96, 101; 110/261, 265

[56] References Cited

U.S. PATENT DOCUMENTS

| | | | |
|---|---|---|---|
| 2,345,067 | 3/1944 | Osann | 432/99 |
| 2,597,585 | 5/1952 | Howard | 432/99 |
| 3,142,480 | 7/1964 | Azbe | 432/99 |
| 3,204,936 | 9/1965 | Beckenbach | 432/101 |
| 3,917,444 | 11/1975 | Carthew | 432/72 |
| 4,002,422 | 1/1977 | Escott | 432/99 |
| 4,021,192 | 5/1977 | Ferguson et al. | 432/179 |
| 4,025,293 | 5/1977 | Beckenbach | 432/101 |
| 4,147,116 | 4/1979 | Graybill | 110/264 |
| 4,206,712 | 6/1980 | Vatsky | 110/264 |
| 4,321,034 | 3/1982 | Taccone | 110/106 |

FOREIGN PATENT DOCUMENTS

1281111 6/1961 Fed. Rep. of Germany .

Primary Examiner—Henry C. Yuen
Attorney, Agent, or Firm—Hill, Van Santen, Steadman & Simpson

[57] ABSTRACT

A method and improved kiln for calcining and sintering of lumpy materials which includes an arrangement for creating a cavity in the material being processed adjacent each burner units so that a solid fuel can be applied on a cavity surface of the material at each burner.

19 Claims, 10 Drawing Figures

RING SHAFT KILN FOR CALCINING MATERIALS AND A METHOD OF OPERATION

BACKGROUND OF THE INVENTION

The present invention is directed to a method and apparatus for a calcining and sintering lumpy materials, such as limestone, dolomite or the like, in a substantially vertical shaft kiln in which the materials are passed in succession through a pre-heating zone, a calcining zone, which has both an upper and lower range, and a cooling zone. In this invention, an annular chamber, which received the material to be processed, is formed by a circumferential wall of the kiln and a cylindrical shaft insert which are spaced apart by refractory bridges which extends therebetween. Cooling air is introduced into the bottom of the cooling zone to flow upward towards the calcining zone. Each of the upper and lower ranges of the calcining zone have burner units or arrangements for introducing fuel and air for burning to produce combustion gases or products with the combustion gases of the upper zone flowing upward towards the preheated zone and the combustion gases in the lower range flowing both upward and downward. The cylindrical shaft insert is provided with an arrangement for removing the cooling air and the combustion gases which are flowing downward towards the cooling zone and then adding additional air and directing this with fuel to the burner units associated with the lower range of the calcining zone. By controlling the amount of the air and the amoung of fuel, different ratios can be obtained so that an excess of air or a deficiency of air can be obtained as well as different temperatures can be obtained in the upper calcining range and the lower calcining range.

A method as well as a ring shaft kiln, which enables passing material through a preheating zone, an upper range and a lower range of a calcining zone and finally into a cooling zone, is known from German Letters Patent No. 1,281,111. In the device of the German Patent, the circulation of gases is employed in the lower part of the lower range of the calcining zone and the fuel is separately supplied to the air flowing through the upper range of the calcining zone in such a manner that a slightly excess amount of air and a high temperature is developed in the upper range of the calcining zone for an intensive deacidification of the material while a high air excess with a low temperature is provided in the lower range of the calcining zone for the remaining deacidification.

Given such kilns, the manner in which the fuel is introduced is of a great importance. For example, fine grained or lumpy, solid fuel can be directly introduced into the interstitial volume of the bulk of the material to be processed and preferably is introduced at a plurality of locations on the kiln wall. The interstitial volume will be formed by the hollow spaces that occur between the material being processed which is a lumpy material. Depending upon the type of material, these hollow spaces have a great range of different sizes and shapes. Beyond that, it must be taken into consideration that the material is moved through the kiln so that the outflow conditions at the discharge of the delivery elements constantly changes during the operation. When given such an introduction of the fuel into the interstitial volume of the bulk material and since the size of the hollow spaces in the bulk material are comparable to the outflow cross-section of the fuel, stable and controlled introduction conditions for the fuel cannot be achieved.

SUMMARY OF THE INVENTION

The present invention is directed to an improvement in a method and device which enables controllable introduction of solid fuel which may be fine grained, powdery or lumpy to be possible with precise and defined conditions in contrast to the known prior art kilns and methods.

To accomplish this, the invention is directed to an improvement in a ring shaft kiln and method for calcining and sintering a lumpy material selected from a group consisting of limestone, dolomite and the like. The kiln is a substantially vertical kiln having an outer circumferential wall surrounding a cylindrical insert spaced from the inner surface of the cylindrical wall by refractory bridges to form a substantially annular space for receiving the material. The kiln has a preheating zone adjacent an upper end, a calcining zone having an upper range with burner means for burning fuel and air to form combustion gases and a lower range having burner means for burning fuel and air to form combustion gases and finally a cooling zone between the lower range and a bottom of the kiln which cooling zone has means for supplying cooling air to the bottom of the cooling zone. The cylindrical insert has an upper and lower hollow sections which are separated by a crosswall with the lower hollow sections being disposed in the cooling zone and the upper hollow section extending from adjacent an upper level of the cooling zone to a point above a plane of the burner means for the upper range. The upper hollow section has an opening in communication with the annular space adjacent to the upper level of the cooling zone and the section is connected to means for drawing the cooling air and also combustion gases flowing downward from the burner means of the lower range into the opening. This means for drawing has means for mixing or adding additional air to the gases and air drawn from the upper hollow section and then returning this mixture to the burner means for the lower range. The improvement in the apparatus is that a refractory bridge is associated with each of the burner means of the upper and lower ranges, said refractive bridge creates a hollow cavity in the lumpy material being treaded with a cavity surface formed by the material, and each of the burner means communicating with its hollow cavity and having means for feeding solid fuel against the cavity surface as the air is introduced.

The improvement in the method is controlling the introducing of the material into a kiln in such a manner that a cavity will exist below each of the refractory bridges with a cavity surface being formed by the lumpy material and then introducing the solid fuel onto the cavity surface of the material of each of the cavities.

A particular advantageous embodiment is to add the material to the kiln in such a manner that the surface of the material between the cylindrical shaft insert and the inside surface of the circumferential wall of the kiln is inclined radially downward towards the outside so that each cavity has a depression in the surface of the material which is formed under the bridge. By so doing, the surface of the material thus receives an essentially frustum-shaped geometry which is particularly favorable for the application of the fuel.

The invention also makes it possible to obtain a uniform distribution of the fuel on the bulky surface of the material and allows the direction of flow of the material relative to the surface to be selectively varied.

It is also possible in a variation of the method to at least partially pre-burn the fuel before it strikes the cavity surface of the bulk of the material. In such an instance, the pressure gradient is maintained in the kiln so that the partially burned fuel penetrate through the cavity surface formed by the material in a desired way.

In other developments of the invention, the cylindrical insert in the upper hollow portion or section has a double wall jacket on an outer surface for preheating the air which is added to the fuel inside of the burner elements. If necessary, the air, which is added to the gases withdrawn from the upper section can also be capable of further preheating by passing it through a recuperator which utilizes the exhaust gases from the kiln. The additional preheated air can be adjusted in its amount in such a manner that an optimum disaggregation of the fuel stream by means of the additional air, which may be required under certain conditions, will occur within the feed element itself or respectively in the direct proximity thereof.

In a desirable development of the method, the fuel is fed through the burner means along a path and is then deflected onto the cavity surface formed in the material. This can be accomplished by providing a deflection plate, which is secured to the outlet end of the feed element for the fuel. The deflection plate and the feed element are designed in such a manner that their orientation relative to the cavity surface can be adjusted as desired.

If the fuel is to be partially burned before striking the surface of the bulk material, then it is particularly advantageous to dispose the feed element in a section of a burner means which is removed from the cavity surface formed in the bulk material.

In order to add preheated air to the fuel being introduced, a double jacketed annular wall is provided in the insert. The preheated air from this double wall can be connected to the feed elements via a recuperator.

For the purpose of mixing the preheated air with the fuel, the feed element advantageous is of a tubular design having orifices along its surface and means for controlling the charging of preheated air through the orifices so that a selected mixing ratio can be obtained. This means for controlling preferably is a jacket or sleeve, which is slidably received on the tubular jacket of the feed element and axially movable from a position exposing all of the openings or apertures in the element to a position closing all of the openings.

In each of the embodiments, it is desirable to be able to visually check the cavity surfaces and also the introduction of the fuel thereon. In order to accomplish this, viewing windows are preferably provided in the kiln wall below each of the refractor bridges but above the surface of the material.

DESCRIPTION OF THE PREFERRED EMBODIMENTS

Figure 1:
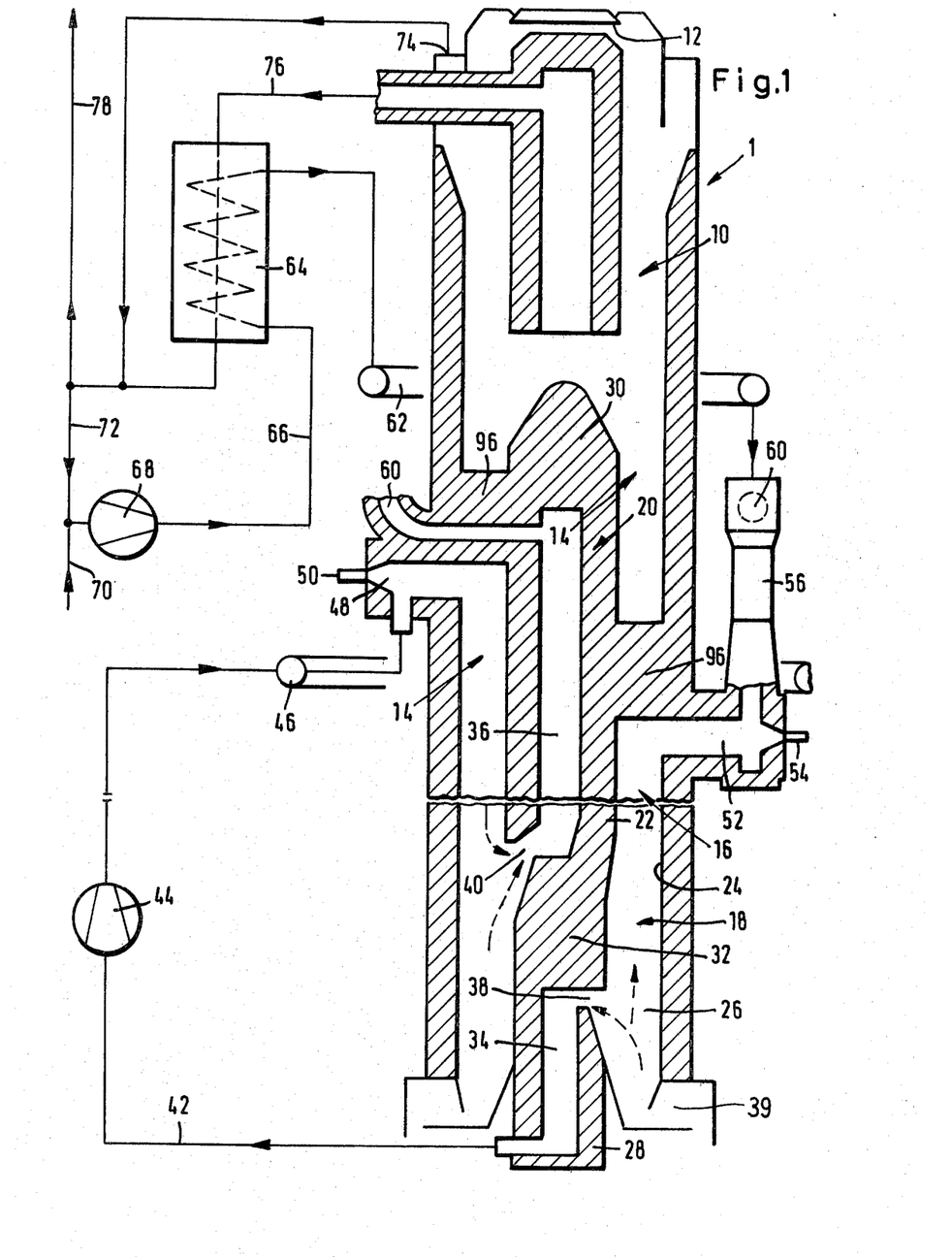
FIG. 1 is a longitudinal cross-sectional view taken on line I—I of FIG. 4 with some parts schematically illustrated of a ring shaft kiln in accordance with the present invention.

The principles of the present invention are particularly useful in a ring shaft kiln generally indicated at 1 and schematically illustrated in FIG. 1. The ring shaft kiln 1 is a substantially vertical kiln which adjacent the top has a preheating zone 10 into which material is to be calcined can be introduced by a feeding device schematically illustrated at 12. Directly beneath the preheating zone 10, the kiln has a calcining zone consisting of an upper range calcining zone or upper range 14 and of a lower range calcining zone of lower range 16. Directly beneath the lower range 16, the kiln has a cooling zone 18.

As illustrated, a cylindrical shaft insert 20 is supported within the ring shaft kiln 1 in a manner which is fundamentally known from the German Letters Patents No. 12 81 111. Extending between a circumferential wall 22 of the cylindrical shaft 20 and an inside wall surface 24 of the outer kiln jacket is an annular space or chamber 26 in which the material to be calcined will travel or pass from the top of the kiln to the bottom. The shaft insert 20 is closed at its lower end by a bottom wall 28 and is closed at the top for example by a conically designed cover 30. The shaft insert 20 is subdivided by a cross-wall or partition 32 into a lower hollow section or portion 34 and an upper hollow portion or section 36. The annular chamber or space 26 is in communication with the lower hollow section 34 of the shaft insert 20 by a cooling air orifice 38 and is also in communication with the upper hollow section 36 by a gas opening 40.

Cooling air is introduced through openings 39 in the bottom of the kiln 1 into the bottom of the cooling zone 18 and a portion will pass through the opening 38 into the lower hollow section 34. The lower section 34 is connected by an air conduit 42 to a blower 44 which draws the air from the section 34 and forces it into a closed-circuit pipe line or bustle pipe 46 which supplies air to a plurality of upper calcining burner chambers forming burning means 48 of the upper range 14. Fuel is supplied to these upper burner chambers or means 48 through a combustion device 50, which will be described in greater detail.

The lower range 16 of the calcining zone also has a plurality of lower calcining burner chambers or burner means 52 which are provided with combustion devices 54. Each of the lower chambers 52 is connected by an injector 56 to a closed circuit pipe line or bustle pipe 62. Each of these injectors 56 is also connected to a discharge channel 60, which leads out of the upper hollow section 36. The passage of gas from the bustle pipe 62 through the injector 56 into the lower burner means 52 will cause a drawing or sucking of gas from the upper chamber 36 into each chamber 52.

The bustle pipe 62 is supplied with a pressurized preheated supply of a mixture of fresh air and combustion gases. This is accomplished by a fresh air supply 70 merging with a exhaust gas feed conduit 72 at the inlet of a compressor 68. The compressor 68 discharges into a conduit 66 that passes through a recuperator 64 and is connected to the bustle pipe 62. The gas in the line 66, while passing through the recuperator 64, is heated by exhaust gases entering into the recuperator from an exhaust supply 76. In addition, exhaust gas supply 74 exits the ring shaft kiln 1 at the upper end of the preheating zone 10 and merges with the recuperator line 76 to form an exhaust gas conduit or line 72. The exhaust gas line 72 also is connected to a line 78 which extends to a flue and enables elimination of exhaust gases which have no further use in the process.

Figure 4:
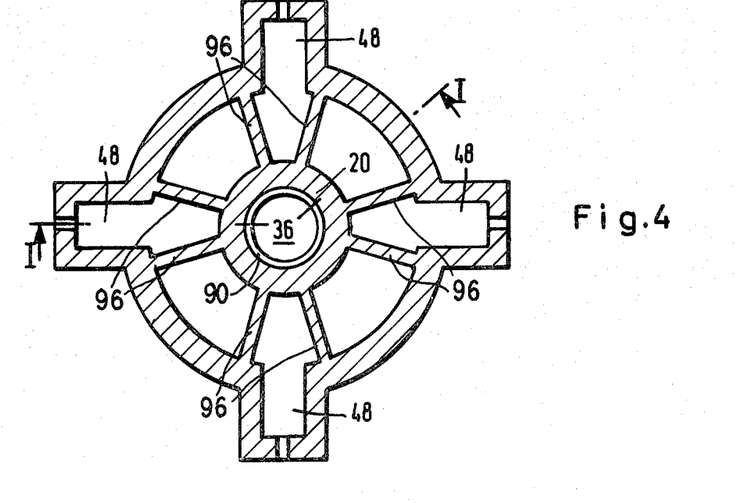
FIG. 4 is a cross-sectional view taken along the line IV—IV of FIG. 2.

Refractory bridges 96 extend between the cylindrical shaft insert 20 and the inside wall surface 24 of the kiln 1. As illustrated each of the burner chambers 48 and 52 is provided with a bridge such as 96 and as illustrated in FIG. 4, four burner chambers 48 are provided at the upper level for the upper range of the calcining zone and thus each has a bridge 96.

Figures 2, 3:
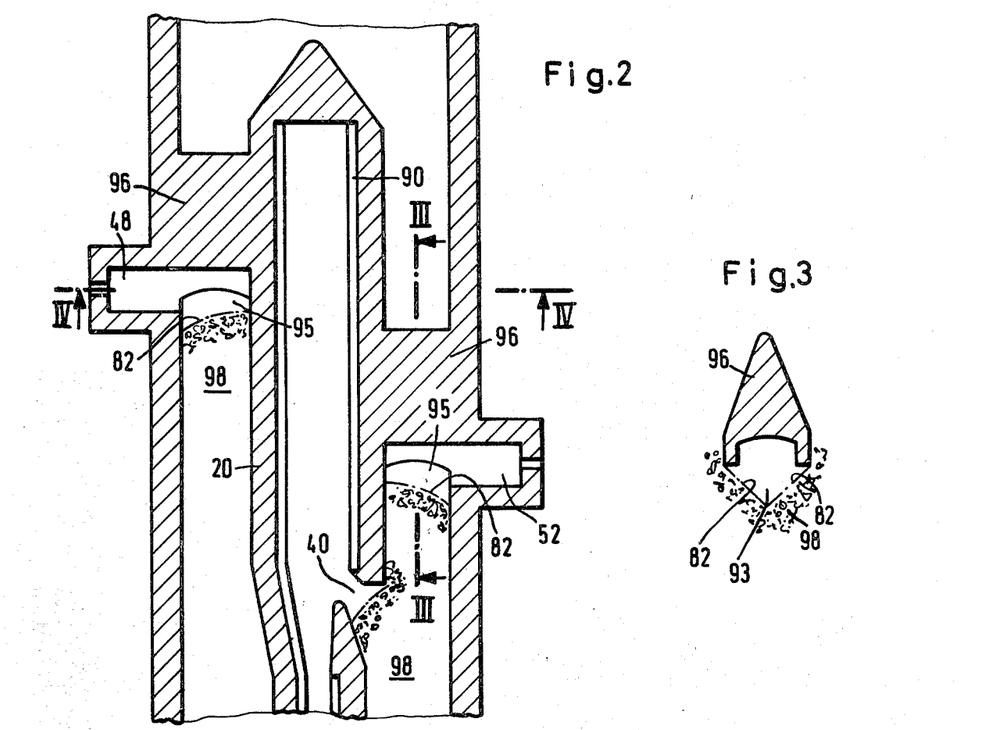
FIG. 2 is an enlarged longitudinal cross-section of the kiln at the level of the combustion chambers or burners.
FIG. 3 is a cross-sectional view taken along the line III—III of FIG. 2.

As best illustrated in FIGS. 2 and 3, the filling or lumpy material 98 which is being processed due to the presence of the bridge such as 96 forms a hollow space or cavity 95 directly beneath the bridge which is in communication with the chamber of the burner means such as 48 or 52 respectively. Each of the cavities has a cavity surface 82 formed in the filling material which is deeply inclined and slopes radially outward and downward from the cylindrical shaft 20 towards the wall of the kiln 1 (FIG. 2). It is also noted that due to the presence of the downward extending side walls on each of the refractory bridges 96, the cavity surface 82 extends downward into the filling material in a depression or in a V-shaped depression 93 (FIG. 3).

As illustrated in FIG. 2, the insert 20 may have a double wall jacket 90 so that air and gases entering opening 40 will be drawn through a tortous path created by the jacket 90 before exiting in the channel 60. Thus, the jacket 90 increases the preheating of these gases.

Figure 5:
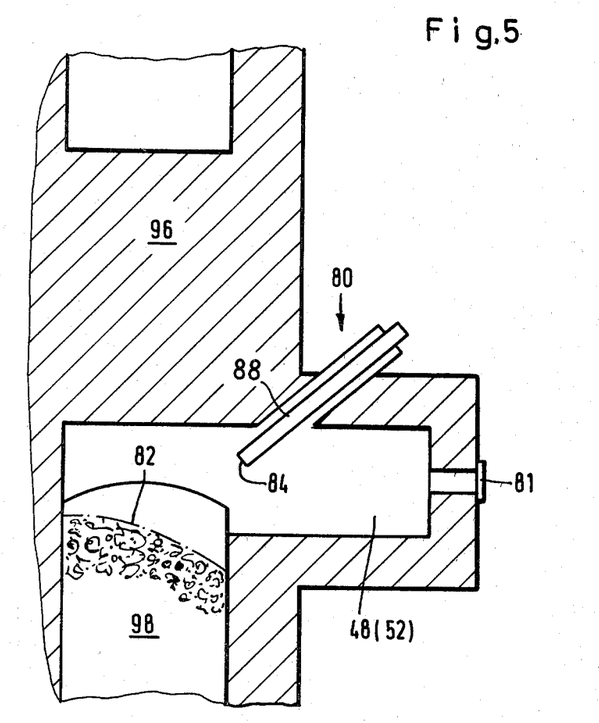
FIG. 5 is an enlarged schematic cross-sectional view of a feed element in accordance with the present invention.

As best illustrated in FIG. 5, each of the burner means such as the burner chamber 48 has a feed element 80 which comprises a tubular member 88 which has an outlet or end 84. The member 88 can be adjusted along its longitudinal axis. Fuel can be introduced into the burner means 48 through the tubular member 88 for discharge through the outlet 84. As illustrated, fuel being discharged through the outlet 84 will strike the surface 82 of the filler material almost in a perpendicular direction. In this embodiment, the feed element 80 is positioned at an angle to the axis of the burner chamber 48 and also to the longitudinal axis of the kiln 1. To enable observation of the supply of the fuel to the surface 82 and also to provide a view of the surface, a window 81 is provided in the chamber such as 48. It is noted that the chambers for the lower burners 52 are of the same type of constructions.

Figure 6:
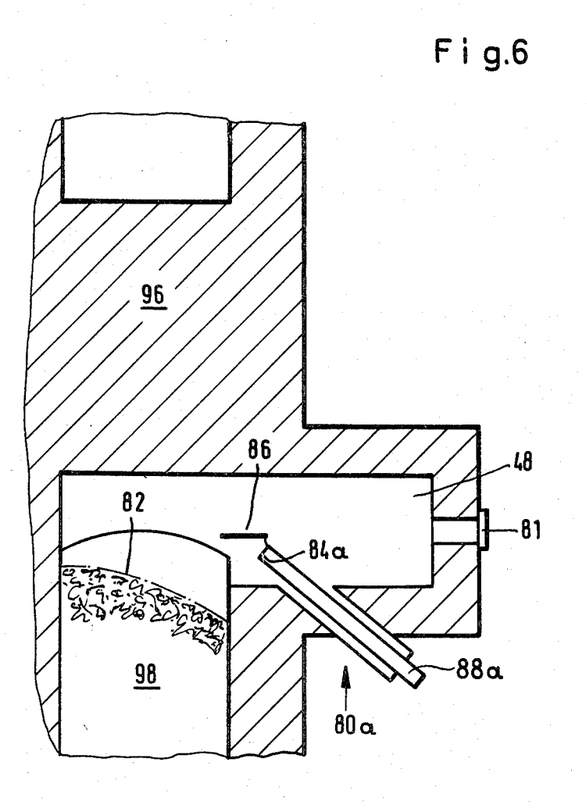
FIG. 6 is an enlarged schematic cross-sectional view of an embodiment of the feed element in accordance with the present invention.

Another embodiment of the feed element 80a is illustrated in FIG. 6 and has a tubular member 88a terminating in an outlet 84a which is provided with a plate 86.

As in the previous embodiment, the tubular element 88a can be adjusted in the chamber 48 and is at an acute angle to the axis of the chamber 48. When fuel is projected through the tube, it strikes or hits the plate 86 and is deflected onto the surface 82 of the filler material 98. The tube 88a forming the feed element 80a can be adjusted both along its axis and also rotated around its axis to enable positioning the plate into the desired relationship to the surface 82.

Figure 7:
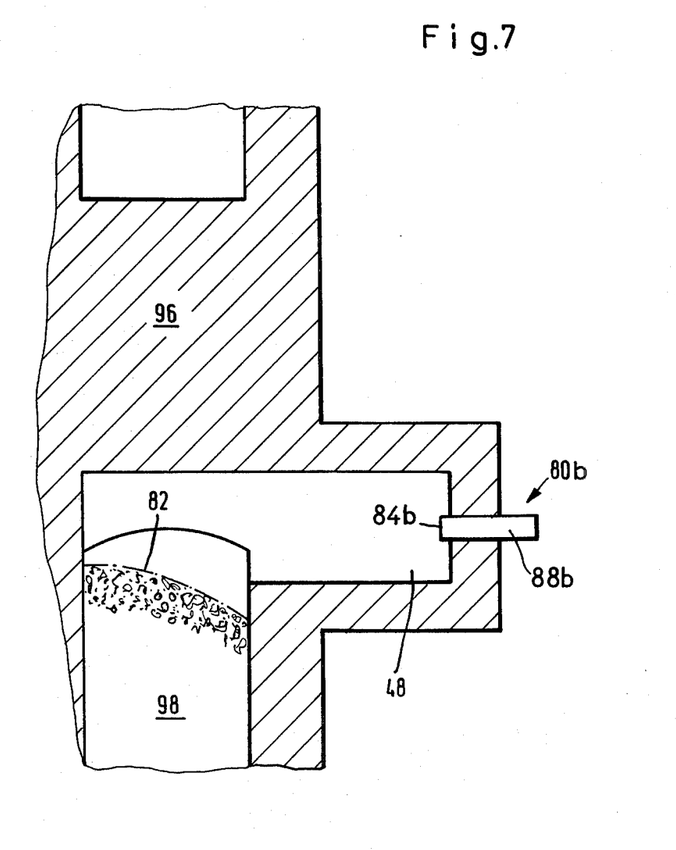
FIG. 7 is an enlarged schematic cross-sectional view of another embodiment of the feed element in accordance with the present invention.

Another embodiment of the feed element is shown by the feed element generally indicated 80b in FIG. 7. In this arrangement, the feed element is formed by a tube 88b having an outlet 84b which is positioned at a distance from the surface 82 of the filler material. Thus, fuel emerging from the outlet 84b must traverse a relatively long path before striking the surface 82 of the filler material and can be partially preburned without any difficulty before it strikes the surface of the material. It is noted that in this arrangement, the tube 88b is on the axis of the chamber 48.

Figure 8:
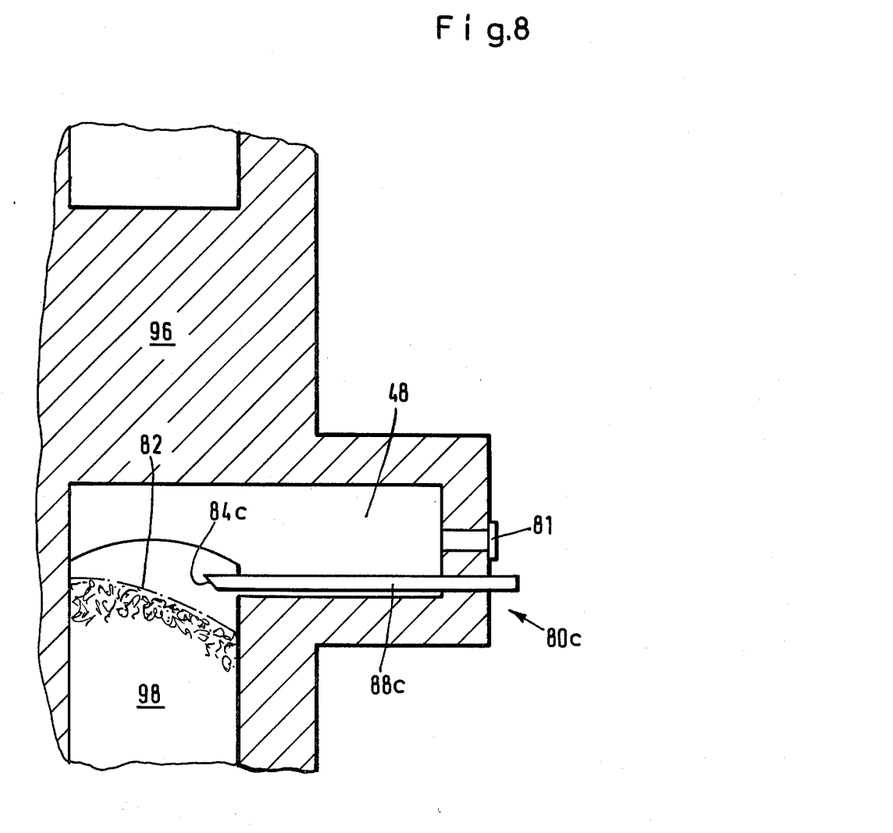
FIG. 8 is an enlarged schematic cross-sectional view of yet another embodiment of the feed element in accordance with the present invention.

Another embodiment of the feed element is generally indicated at 80c in FIG. 8. In this embodiment, it is noted that a tube 88c, which forms the feed element, is positioned adjacent the lower portion of the chamber 48 which is preferably a cylindrical chamber. The outlet 84c of the tube is positioned directly opposite the surface 82 of the filler material. By moving the tube 88c along its longitudinal direction, the outlet 84c can be adjusted relative to the surface 82. As in the previous embodiment a window such as 81 is provided to enable observing the application of fuel onto the surface 82.

Figure 9:
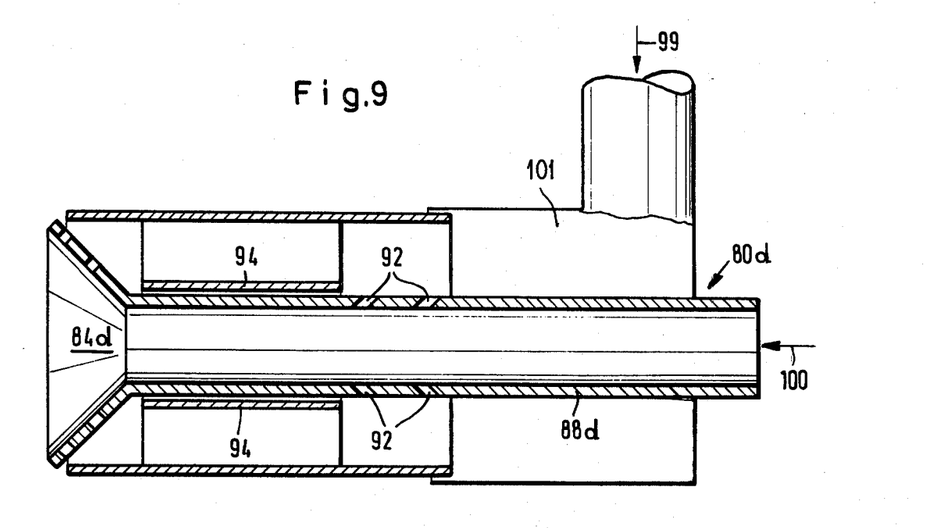
FIG. 9 is a cross-sectional view of the feed element designed as a tube in accordance with the present invention.
Figure 10:
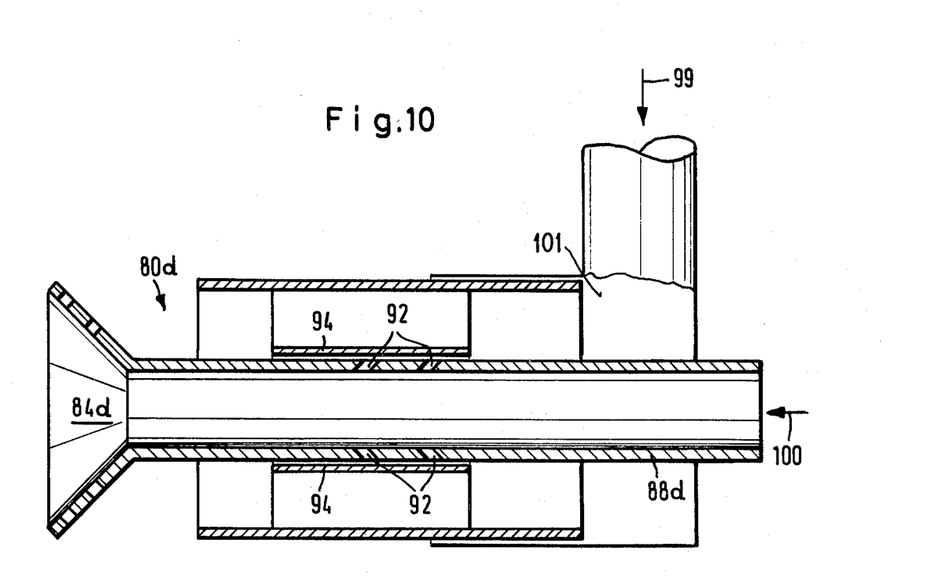
FIG. 10 is the feed element of FIG. 9 with the sleeve closing the orifices.

An embodiment of the feed element is generally indicated at 80d in FIGS. 9 and 10 and includes a housing 101 which supports the elongated tube 88d having a funnel-shape outlet 84d. The housing 101 receives a stream of preheated air indicated by an arrow 99 from the close circuit pipe line 56 or 62 depending upon which one of the burner means the feed element is associated. Fuel is introduced to the interior of the tube 88d as indicated by the arrow 100. The tube 88d has a plurality of orifice or apertures 92 in a wall which enable the preheated air flowing in the housing 101 to enter into the interior of the tube 88d for mixing with the fuel. The element 80d is also provided with means for controlling the mixing of air and fuel which is illustrated as being a sleeve or jacket 94 which surrounds the tube 88 and can be displaced along the axis thereof from a position free from blocking flow into the apertures or orifices 92 as illustrated in FIG. 9 to a position completely blocking the flow into the orifices 92 as illustrated in FIG. 10. Thus by positioning the sleeve 94, the mixing ratio between the preheated air and the fuel can be set as desired. It is noted that the specific structure of the feed member 80d in FIGS. 9 and 10 can be utilized in each of the abovementioned embodiments if desired.

Although various minor modifications may be suggested by those versed in the art, it should be understood that we wish to embody within the scope of the patent granted hereon, all such modifications as reasonably and properly come within the scope of our contribution to the art.

We claim:

1. In a method for calcining and sintering lumpy material, selected from a group consisting of limestone, dolomite and the like, in a substantially vertical shaft kiln which method includes passing the material successively through a preheating zone, an upper range of calcining zone, a lower range of a calcining zone and a cooling zone, said shaft kiln having a circumferential wall surrounding a shaft insert spaced between the inner wall by refractive bridges extending therebetween to form an annular space for accepting the material to be processed and forming said zones, said kiln having first means for supplying fuel and air in the upper range for burning to produce combustion products flowing upward through the material and second means for supplying fuel and air to the lower range for burning to produce combustion gases flowing both in an upward direction and a downward direction therefrom, means for introducing cooling air adjacent the lower portion of the cooling zone for flow through the cooling zone towards the calcining zone and means adjacent the upper level of the cooling zone for removing the cooling air flowing upward from the means for introducing and also combustion gases flowing in the calcining zone towards the cooling zone, said method including providing fuel and air for burning at each of said first and second means, providing cooling air at the means for introducing, returning cooling air and combustion gases removed at the means for removing to the second means for mixing with additional fuel and air, controlling the supply of air into each of the first and second means to obtain a different amount of air excesses and deficiencies to obtain different temperatures in the upper and lower ranges of the calcining zone, the improvements comprising a refractory bridge being associated with each of said first and second means, introducing the material into said kiln in such a manner that a cavity exists below each refractory bridge with a cavity surface being formed in the lumpy material and said step of providing fuel and air to each of said first and second means includes introducing solid fuel into the material at each cavity by projecting the solid fuel through each cavity and onto the cavity surface of each of the cavities with at least a portion of the solid fuel being unburned and penetrating the cavity surface to enter the material.

2. In a method according to claim 1, wherein the step of introducing the material through the kiln includes controlling the introduction of the material so that the cavity surface is inclined radially downward from the surface of the shaft insert towards the circumferential wall.

3. In a method according to claim 1, wherein the step of introducing the fuel includes partially preburning the fuel as it enters into the cavity and subsequently maintaining a pressure gradient in the kiln so that the partially burned fuel penetrates the cavity surface formed by the material.

4. In a method according to claim 1, wherein the step of introducing the fuel into the cavity includes blowing the fuel onto the cavity surface with a uniform distribution.

5. In a method according to claim 1, wherein the step of introducing the solid fuel includes directing the fuel as a flow in a direction approximately perpendicular to the cavity surface.

6. In a method according to claim 1, wherein the step of introducing the solid fuel directs the fuel as a flow forming an acute angle to the cavity surface.

7. In a method according to claim 1, wherein the step of introducing the solid fuel into each cavity includes adding a preheated air to said fuel.

8. In a method according to claim 7, wherein said means for removing cooling air and combustion gases includes said shaft insert having an outer wall formed with a double wall jacket to enable preheating the removed gases and said step of providing air comprises pulling air through said double jacket and further heating said air with exhaust gases from said kiln by passing said air through a recuperator before being returned to the second means.

9. In a ring shaft kiln for calcining and sintering a lumpy material selected from a group consisting of limestone, dolomite and the like, said kiln being a substantially vertical kiln having an outer circumferential wall surrounding a cylindrical insert spaced from the inner surface of said wall by refractory bridges to form a substantially annular space for receiving said material, said kiln having a preheating zone adjacent an upper end, a calcining zone having an upper range with burning means for burning fuel and air to form combustion gases and a lower range having a burner means for burning fuel and air to form combustion gases, a cooling zone between the lower range and a bottom of said kiln, and means for supplying cooling air to the bottom of the cooling zone, said insert having upper and lower hollow sections separated by a cross wall with the lower hollow section being disposed in the cooling zone and the upper hollow section extending from adjacent an upper level of the cooling zone to a point above a plane of the burner means for the upper range, the upper hollow section having an opening in communication with the annular space adjacent to the upper level of the cooling zone and being connected to suction means for drawing cooling air and also combustion gases flowing downward from the burner means of the lower range into the opening, said suction means for mixing additional air to the air drawn from the upper hollow section to form a mixture and then returning said mixture to the burner means for the lower range, the improvements comprising a refractory bridge being associated with each of the burner means of the upper and lower ranges, each refractive bridge creating a hollow cavity in the lumpy material with a cavity surface formed by the material, and each of said burner means having a burner chamber communicating with its hollow cavity and having means for feeding a solid fuel into the material at the cavity surface by projecting the fuel through the cavity and against the cavity surface as the air is introduced with a portion of the fuel penetrating the cavity surface to enter the material, said means for feeding including a feed element extending into the burner chamber and terminating at a point spaced from the cavity surface; the insert at the upper hollow section having a double wall jacket with the suction means pulling air and gases through said double wall jacket for preheating, said double wall jacket wall having an exit connected to an exit of a recuperator so that the air being added to the air and gases being drawn through said jacket and being supplied to the burners of the low range is preheated and said means for feeding solid fuel being in communication with said preheated air as it is introduced to the burner means.

10. In a ring shaft kiln according to claim 9, wherein each feed element has an outlet provided with a deflecting plate so that the solid fuel being discharged through the outlet from the feed element is deflected by said plate onto the cavity surface.

11. In a ring shaft kiln according to claim 10, wherein the feed element can be rotated on its axis to set the orientation of the deflecting plate as desired.

12. In a ring shaft kiln according to claim 9, wherein each feed element comprises a tubular member projecting into the chamber.

13. In a ring shaft kiln according to claim 12, wherein the tubular member has a plurality of orifices in communication with a flow of air and means for selectively closing said orifices to adjust the mixture of air with said solid fuel being directed onto the cavity surface.

14. In a ring shaft kiln according to claim 13, wherein the means for selectively closing comprises a sleeve telescopically received by said tubular member and axially movable thereon from a position opening all of said orifices to a position closing said orifices.

15. In a ring shaft kiln according to claim 9, wherein each of said burner chambers is a cylindrical chamber.

16. In a ring shaft kiln according to claim 15, wherein each feed element is positioned adjacent the lower portion of the cylindrical chamber.

17. In a ring shaft kiln according to claim 9, wherein each of said chambers being provided with a window to enable observing the cavity and the feeding of solid fuel therein.

18. In a ring shaft kiln for calcining and sintering a lumpy material selected from a group consisting of limestone, dolomite and the like, said kiln being a substantially vertical kiln having an outer circumferential wall surrounding a cylindrical insert spaced from the inner surface of said wall by refractory bridges to form a substantially annular space for receiving said material, said kiln having a preheating zone adjacent an upper end, a calcining zone having an upper range with burning means for burning fuel and air to form combustion gases and a lower range having a burner means for burning fuel and air to form combustion gases, a cooling zone between the lower range and a bottom of said kiln, and means for supplying cooling air to the bottom of the cooling zone, said insert having upper and lower hollow sections separated by a cross wall with the lower hollow section being disposed in the cooling zone and the upper hollow section extending from adjacent an upper level of the cooling zone to a point above a plane of the burner means for the upper range, the upper hollow section having an opening in communication with the annular space adjacent to the upper level of the cooling zone and being connected to means for drawing cooling air and also combustion gases flowing downward from the burner means of the lower range into the opening, said means for drawing having means for mixing additional air to the air drawn from the upper hollow section to form a mixture and then returning said mixture to the burner means for the lower range, the improvement comprising a refractory bridge being associated with each of the burner means of the upper and lower ranges, each refractive bridge creating a hollow cavity in the lumpy material with a cavity surface formed by the material, and each of said burner means including a burner chamber communicating with its hollow cavity and having means for feeding a solid fuel against the cavity surface as the air is introduced, said means for feeding including a feed element comprising a tubular member projecting into the chamber and having a plurality of orifices in communication with a flow of air and means for selectively closing said orifices to adjust the mixture of air with said solid fuel being directed onto the cavity surface, said means for selectively closing comprising a sleeve telescopically received by said tubular member and axially movable thereon from a position opening all of said orifices to a position closing said orifices.

19. In a ring shaft kiln for calcining and sintering a lumpy material selected from a group consisting of limestone, dolomite and the like, said kiln being a substantially vertical kiln having an outer circumferential wall surrounding a cylindrical insert spaced from the inner surface of said wall by refractory bridges to form a substantially annular space for receiving said material, said kiln having a preheating zone adjacent an upper end, a calcining zone having an upper range with burning means for burning fuel and air to form combustion gases and a lower range having a burner means for burning fuel and air to form combustion gases, a cooling zone between the lower range and a bottom of said kiln, and means for supplying cooling air to the bottom of the cooling zone, said insert having upper and lower hollow sections separated by a cross wall with the lower hollow section being disposed in the cooling zone and the upper hollow section extending from adjacent an upper level of the cooling zone to a point above a plane of the burner means for the upper range, the upper hollow section having an opening in communication with the annular space adjacent to the upper level of the cooling zone and being connected to means for drawing cooling air and also combustion gases flowing downward from the burner means of the lower range into the opening, said means for drawing having means for mixing additional air to the air drawn from the upper hollow section to form a mixture and then returning said mixture to the burner means for the lower range, the improvement comprising a refractory bridge being associated with each of the burner means of the upper and lower ranges, each refractive bridge creating a hollow cavity in the lumpy material with a cavity surface formed by the material, and each of said burner means communicating with its hollow cavity and having means for feeding a solid fuel against the cavity surface as the air is introduced, each of said burner means including a burner chamber extending into the cavity formed by the bridge, and each of said burner chambers being provided with a window to enable observing the cavity and the feeding of solid fuel therein.

* * * * *